United States Patent
Cole et al.

(10) Patent No.: US 9,840,654 B2
(45) Date of Patent: Dec. 12, 2017

(54) KINETIC HYDRATE INHIBITORS WITH PENDENT AMINO FUNCTIONALITY

(71) Applicant: M-I, L.L.C., Houston, TX (US)

(72) Inventors: Rachel Anne Cole, Sandnes (NO); Anders Grinrod, Sandnes (NO); Alexandra Cely, Sandnes (NO)

(73) Assignee: SCHLUMBERGER NORGE AS, Stavanger (NO)

( * ) Notice: Subject to any disclaimer, the term of this patent is extended or adjusted under 35 U.S.C. 154(b) by 693 days.

(21) Appl. No.: 13/679,457

(22) Filed: Nov. 16, 2012

(65) Prior Publication Data
US 2014/0142002 A1  May 22, 2014

(51) Int. Cl.
*C09K 8/528* (2006.01)
*C09K 8/52* (2006.01)

(52) U.S. Cl.
CPC ............... *C09K 8/528* (2013.01); *C09K 8/52* (2013.01); *C09K 2208/22* (2013.01)

(58) Field of Classification Search
None
See application file for complete search history.

(56) References Cited

U.S. PATENT DOCUMENTS

| | | | |
|---|---|---|---|
| 5,244,878 A | 9/1993 | Sugier et al. | |
| 6,242,518 B1 | 6/2001 | Bakeev et al. | |
| 2004/0163307 A1 | 8/2004 | Dahlmann et al. | |
| 2008/0113878 A1 | 5/2008 | Leinweber et al. | |
| 2008/0214726 A1* | 9/2008 | Freeman | C08F 220/34 524/555 |
| 2008/0214865 A1 | 9/2008 | Leinweber et al. | |
| 2008/0312478 A1 | 12/2008 | Talley et al. | |
| 2010/0144559 A1 | 6/2010 | Rivers et al. | |
| 2010/0213408 A1* | 8/2010 | Feustel | C09K 8/52 252/182.12 |
| 2014/0346117 A1* | 11/2014 | Klomp | C10L 3/10 210/698 |

FOREIGN PATENT DOCUMENTS

| | | |
|---|---|---|
| EP | 1048892 A1 | 11/2000 |
| EP | 896123 B1 | 7/2005 |
| WO | 9412761 A1 | 6/1994 |
| WO | 2006084613 A1 | 8/2006 |

OTHER PUBLICATIONS

Pramanick, et al., "Synthesis and biodegradation of polymers derived from aspartic acid", Biomaterials, vol. 8, Sep. 1987, pp. 407-410.
Won, et al., "Synthesis and Characterization of Biodegradable Poly(L-aspartic acid-co-PEG)", Journal of Polymer Science: Part A: Polymer Chemistry, vol. 36, 1998, pp. 2949-2959.
International Search Report & Written Opinion issued in PCT/US2013/068855 dated Feb. 17, 2014; 13 pages.

* cited by examiner

*Primary Examiner* — Jeffrey Washville
(74) *Attorney, Agent, or Firm* — Sara K. M. Hinkley

(57) ABSTRACT

A kinetic gas hydrate inhibitor is provided as a polyester polymer with a plurality of amino or ammonium groups pendent directly from the backbone. A composition containing concentrated kinetic inhibitor is injected into gas wells, or into other systems involving transporting liquid gas mixtures through a conduit. Use of the kinetic inhibitor prevents formation of gas hydrates under conditions of temperature and pressure where they would otherwise occur.

13 Claims, 1 Drawing Sheet

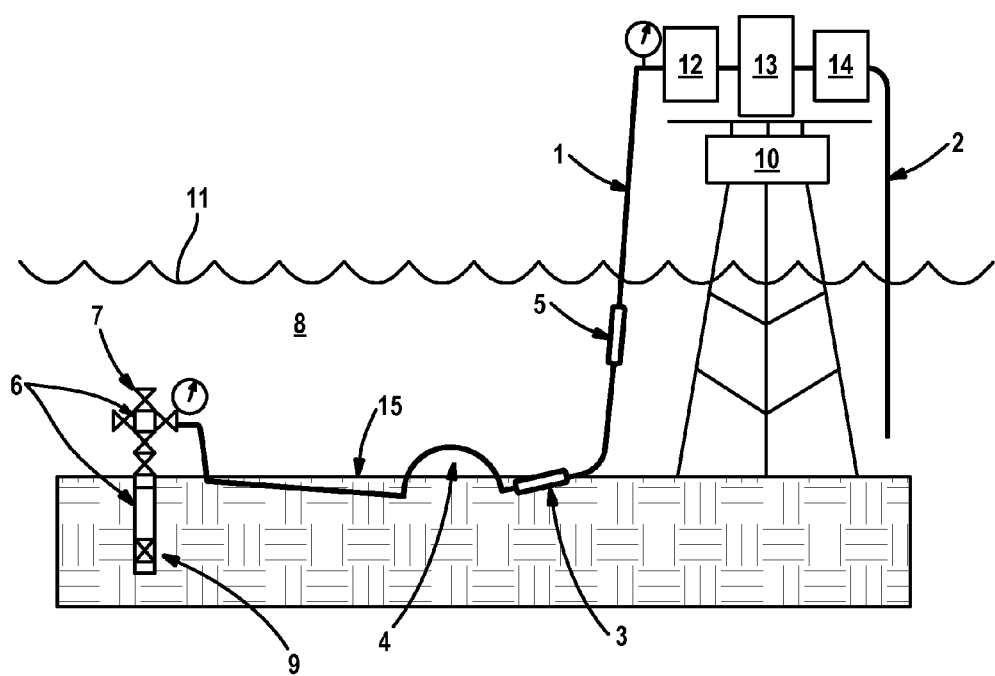

KINETIC HYDRATE INHIBITORS WITH PENDENT AMINO FUNCTIONALITY

BACKGROUND

The statements in this section merely provide background information related to the present disclosure and may not constitute prior art.

Gas hydrates and their formation are significant for the crude oil and natural gas industry. Formed from water and natural gas constituents such as methane, ethane, propane, iso-butane, nitrogen, carbon dioxide and hydrogen sulfide, they pose a great problem, especially when wet gas or multiphase mixtures of water and gas constituents are subjected to low temperatures under high pressure. Under such conditions, gas hydrates can form that lead to blockage of a wide variety of equipment such as pipelines, valves, and other production equipment. The formation of gas hydrates is especially problematic when such multi-phase mixtures are to be transported over relatively long distances at relatively low temperatures such as are found in cold regions of the earth (where the gas mixtures is transported over land) and on the sea bed floor, where production is from sub-sea formations.

One way of preventing the formation of gas hydrate in gas pipelines during transport is to use relatively large amounts—for example more than 10% by weight—of antifreeze alcohol such as methanol or ethylene glycol. These are called thermodynamic inhibitors because they shift the conditions of gas hydrate formation to lower temperatures and higher pressures, so as to inhibit the formation of the hydrates under the conditions being used. On the downside, the use of thermodynamic inhibitors introduces safety concerns such as flash point and toxicity of the inhibitors themselves, along with logistical problems and associated high costs.

As a result of the disadvantages of thermodynamic inhibitors, the industry has made attempts at using other inhibitors in lower amounts (such as less than 2%). The inhibitors either delay gas hydrate formations (kinetic inhibitors) or they keep gas hydrate agglomerates small and therefore pumpable (agglomerate inhibitors or antiagglomerants). Kinetic inhibitors prevent nucleation or growth of gas hydrate particles or modify the growth of the hydrate in such a way that small hydrate particles result.

A wide variety of monomeric and polymeric substances have been identified in patent literature as useful as kinetic inhibitors. Examples include polyvinyl pyrrolidone (WO 94/12761), copolymers of alkoxylated monomers (EP 0896123), polyvinyl alcohol or partially hydrolyzed polyvinyl acetate (EP 1048892) and polyols esterified with fatty acids or alkenyl succinic anhydrides (U.S. Pat. No. 5,244, 878). A more recent U.S. Publication No. 2008/0214865 has disclosed polymers made by esterifying pendent hydroxyl groups on the backbone of a polyester polyol and its use of a kinetic hydride inhibitor. Some of these inhibitors have certain drawbacks, such as a lack of biodegradability, and/or the presence of a upper solubility limit in temperature (cloud point). It would be an advance in the art to provide improved kinetic hydrate inhibitors that combine biodegradability and favorable cloud point behavior with effectiveness against hydrate formation at 4 to 6° sub-cooling.

SUMMARY

Compositions and processes for inhibiting gas hydrate formation during transport of mixtures containing gas and hydrocarbon involve the use of a certain polyester polymer as a kinetic hydrate inhibitor. The polyester polymer is made of a plurality of ester groups in the polymer backbone and a plurality of amino or ammonium groups directly pendent from the backbone of the polymer. The polyester polymer can be made for example by polymerizing an amino functional di-acid or di-ester with an alkylene or oxyalkylene diol or triol. During polymerization of monomers, sufficient amino functional monomers are included to give a polyester polymer having suitable kinetic hydrate inhibition properties. An exemplary kinetic hydrate inhibitor is the copolymer of aspartic acid and triethylene glycol.

In various embodiments, the kinetic hydride inhibitor is formulated into compositions containing water and preferably other solvents that provide an antifreeze effect for the composition. In non-limiting fashion, the kinetic hydrate inhibitor can be formulated with methanol, ethanol, ethylene glycol, diethylene glycol, triethylene glycol, and the like to provide an antifreeze effect. In addition, the compositions can further contain other organic molecules that act as synergists in improving the function of the polyester polymer as a kinetic inhibitor.

The composition containing concentrated kinetic inhibitor is preferably injected into gas wells, or into other systems involving transporting liquid gas mixtures through a conduit, at appropriate locations where the kinetic inhibitor will be present in the composition being transported at the time that the composition is exposed to conditions of temperature and pressure where formation of gas hydrates would otherwise occur.

BRIEF DESCRIPTION OF THE DRAWINGS

FIG. 1 illustrates hydrate blockage in natural gas facilities.

DESCRIPTION

At the outset, it should be noted that in the development of any actual embodiment, numerous implementation-specific decisions must be made to achieve the developers specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited.

In the summary and this detailed description, each numerical value should be read once as modified by the term "about" (unless already expressly so modified), and then read again as not so modified unless otherwise indicated in context. Also, in the summary and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

In one embodiment, a method involves transporting a mixture containing hydrocarbon and water, for example in a conduit, at a temperature sufficiently low and at a pressure sufficiently high that hydrocarbon hydrates would form in the absence of a hydrate inhibitor. The mixture of hydrocarbon and water contains an aqueous phase in contact with a gaseous and hydrocarbon phase. The aqueous phase contains a kinetic hydride inhibitor that is a polyester polymer containing a plurality of ester groups in the backbone and a plurality of amino or ammonium groups directly pendent from the backbone. In various embodiments, the aqueous phase also contains a synergist such as glycol ether. In non-limiting example the glycol ether is selected from $C_3$ to $C_6$ ethers of a $C_2$ or $C_3$ glycol. In various embodiments, the conduit is a natural gas pipeline, a well bore or another conduit associated with production of hydrocarbons such as crude oil or natural gas. The hydrocarbon being transported in the conduit is selected from crude oil, natural gas, and the components or by products of each. Examples of components that could lead to formation of hydrates include methane, ethane, propane, iso-butane, n-butane, nitrogen, carbon dioxide and hydrogen sulfide.

In another embodiment, a composition or process for inhibiting gas hydrate formation in an aqueous phase in contact with a gaseous or liquid organic phase involves providing the aqueous phase with suitable amount of a kinetic inhibitor. As in the embodiment discussed above, the kinetic inhibitor is selected from polyester polymers containing a plurality of ester groups in the polymer backbone and a plurality of amino or ammonium groups directly dependent from the backbone.

In another embodiment, a method of inhibiting the formation of gas hydrates in a natural gas production system involves injecting an aqueous solution containing a kinetic inhibitor into the system at one or more locations. In the system, formation of gas hydrates would block flow in gas transport pipelines, for example between a natural gas production well head and an export flow line, if an inhibitor were not used. As in other embodiments, the kinetic inhibitor is selected from polyester polymers that contain a plurality of polyester groups in the polymer backbone and a plurality of amino or ammonium groups directly dependent from the backbone.

In another embodiment, a composition is provided for use in a process for inhibiting gas hydrate formation in an aqueous phase in contact with a gaseous or liquid organic phase. The method involves use of the composition to provide the aqueous phase with suitable amount of a kinetic inhibitor. As in the embodiments discussed above, the kinetic inhibitor is selected from polyester polymers containing a plurality of ester groups in the polymer backbone and a plurality of amino or ammonium groups directly pendent from the backbone.

In another embodiment, a method of preventing formation of gas hydrates in a natural gas production system involves injecting an aqueous solution containing a kinetic inhibitor into the system at one or more locations. In the system, formation of gas hydrates would tend to block flow in gas transport pipelines—for example between a natural gas production well head and an export flow line—if an inhibitor were not used. As in other embodiments, the kinetic inhibitor is selected from polyester polymers that contain a plurality of ester groups in the polymer backbone and a plurality of amino or ammonium groups directly pendent from the backbone.

In another embodiment, a method of preventing formation of gas hydrates in a natural gas production system involves use of a kinetic inhibitor with a combination of desirable properties. The kinetic inhibitor is 20% or greater biodegradable, exhibits no inherent cloud point behavior upon heating, and gives an induction time greater than 24 hours at 6° C. sub-cooling measured using synthetic natural gas. In various embodiments described herein, the kinetic inhibitor is chosen as a polyester copolymer of an amino or ammonium functional diacid and a diol. In a particular embodiment, the kinetic inhibitor is a copolymer of aspartic acid (normally used as its hydrogen hydrochloride salt) and triethylene glycol.

The compositions and methods described herein provide the oil or natural gas producer with advantages that derive from the prevention of gas hydrates in pipelines, conduits, transmission lines and the like. The methods and compositions involve the use of a new kinetic inhibitor, being a polyester polyol having an amino or ammonium group pendent from the backbone. Further non-limiting description of the polymer and other components of the compositions used in the method is given below and exemplified by way of working examples. It is to be understood that, unless context requires otherwise, various embodiments or limitations of the components of the composition or certain of the steps in a method can be combined with the description of other methods or compositions as the case may be.

Amino Functional Polyesters

The polymeric material useful as a kinetic hydrate inhibitor is describable as a polyester polymer having a plurality of ester groups in the backbone and a plurality of amino or ammonium groups directly pendent from the backbone. As will be clear from the description, the amino or ammonium group is incorporated into the polyester polymer by providing such a group on one of the monomers that are polymerized to produce the polyester polymer. Advantageously, an amino group on a starting monomer is first converted to a protected amino group such as an ammonium salt (hereafter an ammonium group) in order to prevent unwanted side reactions during the synthesis of the polymer. Furthermore, the polymer will be used in the kinetic anhydrate inhibitor compositions under conditions of pH where the amino groups will normally be protonated. Thus, if a polymer containing pendent amino groups is added to water, the resulting solution will normally contain at least a fraction of the amino groups being protonated. If no acid is provided in the inhibitor composition, the amino group will be converted at least partially into ammonium hydroxide groups. If instead the inhibitor composition is provided with an acid such as hydrogen chloride, the amino group will be converted to an ammonium chloride group. Finally, if the protonated polyester (i.e., protonated on the amino group pendent from the backbone) is used directly in the composition, the resulting solution will contain a kinetic hydrate inhibitor that has ammonium groups pendent from the backbone. For these situations, the disclosure herein describes the polyester polymers as having an amino group or an ammonium group pendent from the backbone. It is to be understood that normally the polymer as prepared will contain an ammonium group and that the ammonium group survives, as it were, incorporation into the various hydrate inhibitor compositions. Although the invention is not limited to a particular mode of action, it is believed that the pendent amino or ammonium group is incorporated in some way into the lattice of the gas and water mixture so as to interfere with the formation of the hydrate material and to slow down its formation.

As noted, the kinetic hydrate inhibitor is based on a polyester polymer containing a plurality of ester groups in the backbone and a plurality of amino or ammonium groups pendent from the backbone. Schematically, such polyesters can be represented by the following formulas:

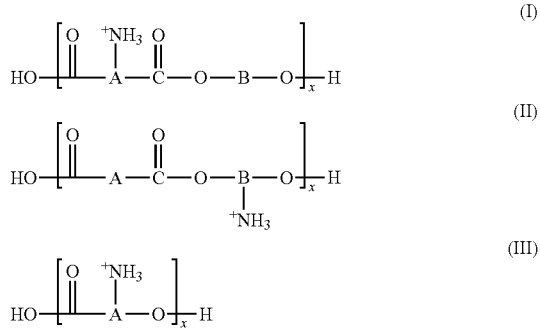

It is to be understood that Formulas (I)-(II) represent an idealized structure that is expected to result when approximately equal molar amounts of diol and diacid are used in the reaction. If instead an excess of diol is used, the polymer is likely to have two hydroxyls as terminal groups instead of the mixed acid and hydroxyl groups shown in Formulae (I) and (II). Likewise, if a molar excess of diacid (or diester, etc. as discussed further below) is used, the resulting polyester is likely to have two terminal carboxyl groups. Such polymers representing variations on the idealized structures of Formulae (I) and (II) are within the scope of the invention.

In schematic form, Formula I shows a reaction product of a diacid (or diester, as explained further herein) containing an ammonium group and a diol without a pendent group The groups A and B are further described below, and the subscript x in the formulae represents an arbitrary degree of polymerization that is based on the synthetic conditions used.

Likewise, Formula II represents the polymerization or condensation product of a diacid without a pendent group and a diol containing Group B to which a pendent ammonium group is attached. Finally, Group III shows in schematic form the polymerization product that results from ring opening polymerization of an ammonium containing lactone to provide a polyester having ammonium groups pendent from the side chain.

In various embodiments, the kinetic hydrate inhibitor polymer is a reaction product of monomers that contain functional groups that react to form ester linkages in the backbone, and at least some of which have ammonium, groups (or amino groups, depending on the pH) that become the pendent ammonium groups upon polymerization. An example is a reaction product of an ammonium functional diacid and a non-functional diol or triol (an aspect of this is illustrated in Formula I). In another aspect, the inhibitor is the reaction product of a non-functional diacid and an ammonium functional diol or triol. One aspect of this is illustrated in Formula II. In another embodiment, the polyester polymer is the reaction product of a) a mixture of diacids, at least one of which is an ammonium functional diacid, and b) a mixture of non-functional diols or other polyols.

In yet another embodiment, the inhibitor is the reaction product of a) a mixture of non-functional diacids and b) a mixture of diols and/or triols, including at least one diol or triol that is ammonium functional.

In the above description, a "non-functional" diacid, diol, or triol means one that is not substituted with an amino or ammonium group.

In any of the embodiments above, instead of a diacid, the starting material for synthesizing the polyester polymer useful as a kinetic inhibitor can be a diester or a monomer containing any other group that will react with the hydroxyl functional group of the other monomer to produce ester groups in the backbone of the polymer.

It is also to be understood that, wherever the polyester is described as the product of a functional monomer and a non-functional other monomer, the functional monomer can be a mixture containing non-functional monomers of that type as well as some that are functional. For example, when incorporation of ammonium groups into the polyester results from using an ammonium functional diacid, the monomers used to synthesize that polyester can comprise a fraction of non-functional diacids, as long as there is a suitable concentration of ammonium functional diacids to lead to incorporation of a suitable amount of pendent ammonium groups. Likewise, if the starting diol or triol is ammonium functional, the monomers used to synthesize the polyester can comprise a fraction of non-functional diols (or triols) as long as a suitable fraction has ammonium functionality for incorporation into the polymer.

Similar considerations apply, when the starting material has both acid and alcohol functionality. As an illustration, compounds of Formula III can be produced as the reaction product of an ammonium functional lactone and a fraction of non-functional lactones.

The concept of functional monomers mixed with non-functional monomers can be expressed as a kind of "mole fraction" incorporation of ammonium groups onto the background of a polyester. The mole percent is the percentage of starting monomers that have an ammonium group and that are incorporated into the polymer. Assuming an ideal synthesis, the fraction incorporated into the polymer is the same as the fraction in the starting materials.

In an ideal synthesis to make, for example to make polyester of Formulas I, II, and III, one of the monomers (i.e., the diacid or the diol) is 100% substituted with ammonium groups, while the other monomer has no ammonium substitution. For Formulae (I) and (II), the result is incorporation of ammonium groups on 50% of the monomer units in the polyol. As used herein, this represents 50 mole % incorporation. Because in the general case both the diacid and diol can contain complete or partial ammonium group incorporation, it can be seen that the resulting polyester polyol can contain more than 50 mole % ammonium and even up to 100%. Likewise, by suitably choosing a fractional incorporation of ammonium with respect to both the diacid and the diol components, all mole fractions of ammonium group incorporation into a polyester are possible, for example from 1 mole percent to 100 mole percent.

In various embodiments, suitable kinetic hydrate inhibitors have 0.01-1.0% mole fraction (also designated as 1-100 mole %) of amino groups incorporated onto the polyester backbone chain in this fashion. In other embodiments, the ammonium group incorporation is 10-100 mole %, 20-100 mole %, 30-100 mole %, 40-100 mole %, or 50-100 mole %. In other embodiments, the kinetic hydrate inhibitor has a ammonium group incorporation of 10-90 mole %, 20-80 mole %, 30-70 mole %, or 40-60 mole %. In a particular embodiment, the polyester has 50 mole % ammonium groups.

In light of the above discussion of the polyesters, in one embodiment, the inhibitor is selected from a reaction product of diacid or diester. Formula IV with diol or triol Formula V.

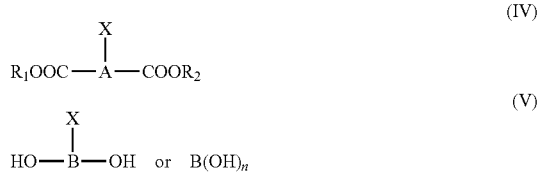

In Formula IV, $R_1$ and $R_2$ are independently H or alkyl and X represents the amino group or the ammonium group $NH^{+3}$. The Group A is alkylene of 1-40 carbon atoms. In Formula V Group B is selected from branched or unbranched alkylene and branched or unbranched oxa-substituted alkylene. The group X is attached to one of the carbon atoms of A or of B. The variable n is 2 for a diol, 3 for a triol, and 4 for a tetrol. In a particular embodiment, A is $C_1$-$C_6$ alkylene, B is $C_2$-$C_{12}$-alkylene or -polyoxyalkylene and n is 2 or 3.

In further embodiments, A in the acid monomer formula IV is $C_3$ or $C_4$ alkylene, and the polyol component of Formula V is ethylene glycol, diethylene glycol, or triethylene glycol. Examples of diacid/diester of Formula IV include aspartic acid or its dialkyl esters (A is $C_2$ alkylene) and glutamic acid or its diesters (A is $C_3$ alkylene), both having substitution of the ammonium group on a carbon adjacent to the carboxyl group drawn in Formula IV.

Thus in various embodiments, the kinetic hydrate inhibitor has a structure that is represented as a reaction product of aspartic acid or glutamic acid with a diol or triol. In other embodiments, the kinetic anhydrate inhibitor is selected from copolymers of aspartic acid with polyols such as sorbitol, ethylene glycol, diethylene glycol, triethylene glycol, PEG-200 and PEG-400.

As noted, in various embodiments Group B is an oxa-substituted alkylene group. An oxa-substituted alkylene group is an alkylene group in which one or more of the carbons is substituted with an oxygen atom, forming an ether or polyether. One example of an oxa-substituted alkylene group is the polyoxyalkylene described above. Other oxa-substituted groups include alkoxy, polyoxy(alkanediyl), alkoxyalkyl, alkylalkoxy, and the like. Some groups are described as either a polyoxyalkylene or an oxa-substituted alkylene group, the latter being more generic. Thus, polyoxyalkylenes such as PEG-200 and PEG-400 can also be described as oxa-substituted alkylene groups.

Performance as Kinetic Dehydrate Inhibitors

As noted above, it is believed that the pendent ammonium groups of the inhibitors give rise to their activity in preventing (or slowing down) formation of gas hydrates. The efficiency of kinetic hydrate inhibitors is screened and demonstrated in a conventional lab procedure that measures the induction time of gas hydrate formation under defined levels of sub-cooling. In various embodiments, use of a kinetic hydrate inhibitor will produce an induction time of one hour or greater, two hours or greater, 5 hours or greater, 6 hours or greater, 10 hours or greater, 12 hours or greater, 24 hours or greater, or one week or greater at sub-cooling temperatures of 4°, 6°, or 12°.

To measure these parameters, testing of hydrate inhibitors is carried out on a hydrate rocking cell system. The test gives the possibility to simulate conditions of pressure and temperature where hydrates form and test for hydrate inhibition. In one commercial embodiment, the hydrate rocking cell system is composed of six sapphire rocking cells that are transparent for close observation of the sample behavior and the structure of the gas hydrates being formed. The rocking cell apparatus allows water, gas, and hydrate inhibitors to be mixed at constant pressure and decreasing temperature until hydrates are formed. The measurement involves the constant rocking of temperature controlled pressurized sapphire test cells. By tilting, an inserted ball rolls through the entire length of the test cell to mix the contained fluid inhibitor gas mixture. The ball movement also induces shear forces and turbulence inside the test cell, simulating conditions inside a pipeline.

The cells are mounted on a moveable axle, inside a bath of cooling liquid. For a test, the cells are filled with sample fluid (water, oil, or condensate), and the desired amount of inhibitor; subsequently they are cooled to the test temperature. The cells are pressurized with an individual pressure. The test parameters such as rocking angle, rocking rate, and time can be scheduled with software. A camera can be used to record pictures and videos at any time during the experiment.

After the experiment starts, results are recorded and presented in temperature vs. time, pressure vs. time, and run time vs. time graphs These are produced by a software program such as PSL Technik WIN RCS. Formation of gas hydrates can also be visually observed in the test cell.

The concept of an induction time reflects the period in which the test cells are rocked under conditions of a temperature and pressure, but there is no change in the pressure of the system. After a period, the pressure is observed to decrease significantly. The induction time is counted as the time period between the start of the test and observed decrease in pressure. This is correlated to take-up of some of the gas from the gas phase into the aqueous phase form gas hydrates. The reduction in pressure shows that the gas hydrates have formed. Normally, the change in the pressure vs. time curve at the induction time is dramatic, allowing unambiguous assignment of the induction time. Before the dramatic change in the pressure is observed, the pressure can be observed to vary slightly. But the induction time is generally more dramatic.

To set the sub-cooling temperature at which the experiment is run, the system parameters are entered into a software system that calculates the maximum temperature at which hydrates will form. A sub-cooling parameter is chosen as, for example, 4°, 6°, or 12°. To run at 4° sub-cooling means that the temperature of the experiment is 4° lower than the temperature the software predicts for gas hydrate formation. Sub-cooling temperatures are calculated according to conventional means, for example using the Multiflash Infochem software.

In addition to performing acceptably as a kinetic hydrate inhibitor, inhibitors described herein are also biodegradable in sea water in some embodiments. Biodegradability is tested according to standard tests such as the OECD test 306 for biodegradation in sea water. In various embodiments, the polymers exhibit 10% or more, 20% or more, or 40% or more in the OECD test 306 at 56 days.

In addition to suitable kinetic behavior and biodegradability, the polymers preferably also do not exhibit an upper solubility limit that is less than 85° C. In various embodiments, this means that the solutions of the polyester polymers exhibit no clouding out at temperatures up to 85° C. In other embodiments, there is no clouding out at temperatures up to 65° C. or at temperatures up to 75° C. In other embodiments, there is no clouding out up to temperatures to 90° C. In various embodiments, polymers exhibit a cloud point of greater than 65° C., greater than 75° C., greater than 85° C., or greater than 90° C. Cloud point is determined according to industry standard tests such as those published by Shell. A solution of the test chemical is added to the test brine at elevated temperature. The brine is then stepwise cooled. The solubility of the test chemical is observed throughout. The brine chemistry and temperature can be adjusted to match those seen in the relevant application. At the cloud point, a noticeable change in transparency of the solution is observed indicating that the material has reached an upper solubility limit and a cloud point is observed at the transition temperature. An ideal chemical will show solubility both at high and low temperatures, avoiding in particular precipitation at high temperature.

Polyester Formulations

Compositions are formulated that contain the ammonium functional polyester along with other components for use in the field. Other components include water and, where needed, various solvents that provide suitable antifreeze properties, viscosity, and other properties. Non-limiting solvents for the inhibitor compositions include methanol, ethanol, propanol, n-butanol, ethylene glycol, butylene glycol, isobutyl glycol, 2-butoxyethanol, and butyl diglycol.

The composition optionally contains other solvents that can act as a synergist, and increase the effectiveness of the polyester as a kinetic hydrate inhibitor. Thus, in some embodiments, the use of a synergist can lead to longer induction times and/or acceptable behavior at higher degrees of sub-cooling. In non-limiting embodiments, the solvents useful as synergists are made of $C_3$ to $C_{10}$ ethers of $C_2$ to $C_4$ glycols. In other embodiments, the synergists are $C_3$ to $C_6$ ethers of $C_2$ to $C_3$ glycols. In describing the structure of the synergists the C number of the ether component does not count any oxygen atoms that are present in an oxo-substituted ether. Thus, for example, the butyl ether of diethylene glycol, which can be represented by the structure —$C_4H_9$—O$C_2H_4$—OCH$_2$CH$_2$—OH is a $C_6$-ether of a $C_2$ glycol. That is, the butoxyethyl group that etherifies carbon 2 of the ethylene glycol has 6 carbons. In this way it qualifies as a $C_6$ ether of a $C_2$ glycol.

In various embodiments, suitable synergists can be identified empirically by formulating them with the hydrate inhibitor and measuring induction times. In non-limiting fashion, suitable synergists can be selected from the group consisting of 2-butoxyethanol, 2-isopropoxyethanol, 1-propoxy-2-propanol, 2-(2-butoxyethoxy)ethanol, 1-butoxy-2-propanol, and 2-propoxyethanol.

Formulated compositions contain the polyester or kinetic hydrate inhibitor in concentrated amounts, for example at 10-50% by weight, and typically at about 30% by weight. The solvent added is for antifreeze purposes are typically included in a range of about 10 to about 50% by weight, and typically about a 30% by weight. The solvent added for antifreeze purposes are typically included in a range of about 10 to about 50% by weight, where the percentage by weight involves a total of solvent and optional synergists. The synergist, which is added in certain embodiments to improve the kinetic hydrate inhibition behavior, is added at a lower amount such as 5 to 30% by weight, 10 to 20% by weight or the like. The balance of the composition can be formulated with water.

The result of the formulation of the hydrate inhibitor composition is a polymer solution that can be injected at convenient injection rates to provide needed inhibition of the formation of gas hydrates in the field. In non-limiting embodiments, the compositions described above are applied continuously by injecting them at suitable rates into the production facilities as needed. In various embodiments, they are injected at rates of 0.1 to 5% or about 0.5 to 3% by weight based on the weight of the gas water mixture being protected.

Use as a Kinetic Inhibitor

Compositions containing the ammonium function of polyesters are injected or fed into production facilities wherever there is even a possibility of water coming into contact with hydrocarbon phase. Examples of hydrocarbons include crude oil, condensate, gas, mixtures of gas and condensate, and even dry gas. Advantageously, the induction time of a prospective kinetic inhibitor of the current teachings corresponds to the transit time in a particular pipeline or flow line in which there is a risk of gas hydrate formation to be mitigated.

In various embodiments, the composition is applied at a dedicated spot in a subsea well before the mixture of water and gas would be exposed to temperatures at the bottom of the ocean. After a field is developed, gas water mixtures are routed to a subsea well head, where the inhibitor composition can also be injected. In other embodiments, the kinetic inhibitor composition is used in surface separation facilities and in export lines. These embodiments are non-limiting examples of transporting a mixture containing water and hydrocarbon or hydrocarbon gas in a conduit. If conditions of temperature and pressure are in certain values, there is a risk of hydrate formation. Wherever there is such a risk, the kinetic hydrate inhibitor solution is used to provide a water phase with an effective concentration level of the ammonium functional polyester. By injecting the kinetic hydrate inhibitor composition at suitable locations, the current teachings provide for transporting a mixture containing hydrocarbon and water in a conduit at temperatures sufficiently low and at temperatures sufficiently high that hydrocarbon hydrates would form in the absence of the hydrate inhibitor. Use of the kinetic hydrate inhibitor compositions in this way also involves providing an aqueous phase that contains a kinetic hydrate inhibitor and optionally a synergist, where the hydrate inhibitor is a polyester polymer as described.

When used according to the current teachings, the method also provides for inhibiting gas hydrate formation in an aqueous phase that is in contact with a gas or liquid organic phase, where the gas or liquid organic phase contains hydrocarbons that can form hydrates in combination with water at certain conditions of temperature and pressure. By using the kinetic hydrate inhibitor composition as described, the process involves providing the aqueous phase in contact with the hydrocarbon with a suitable amount by weight of a kinetic inhibitor, wherein the kinetic inhibitor is a polyester polymer as described. In various embodiments, the use of the kinetic hydrate inhibitor composition leads to a polymer concentration of 0.01 to about 3% by weight of the kinetic inhibitor in the aqueous phase that is in contact with the hydrocarbon.

Control of Hydrate Formation in the Field

Hydrates are a mixture of water and gas molecules that crystallize to agglomerate or form a solid "ice-like" plug under appropriate conditions of temperature and pressure.

Hydrates can form from water in combination with low molecular weight gases such as methane, ethane, propane, carbon dioxide, and hydrogen sulfide present either dissolved in liquid hydrocarbon or as a free gas phase. They can form at high pressure even when the temperature of the flowing gas is well above the freezing point of water.

Hydrate formation is a major hazard in pipelines that carry wet gas. Pockets of water will form in low points of the line, and hydrates can form downstream of that water, particularly if the pipe passes through a temperature change. Apart from the pipe temperature change, the gas temperature itself will decrease while traveling through the pocket of water, resulting in a pressure drop. The saturated gas then contacts the free water at reduced temperature. For pipelines that carry wet gas and traverse changing elevations, hydrates can form at any elevation change where pockets of water lie. In gas production, hydrates restrict the normal flow of gas, and the resultant pressure drop across the hydrate will cause the gas to expand. This expansion cools the gas through auto refrigeration, contributing to further growth of hydrates until normal flow is completely blocked.

Some locations where hydrates occur are pipelines, flowlines, well tubing and casing. Hydrates also form where there is a sharp reduction in pressure, such as at:

orifices;

partially open control valves;

sudden enlargement on pipelines; and short radius elbows.

The reduction in pressure causes the temperature to drop and consequently free water to condense.

Indeed, hydrates can form in any segment of an operating system:

downhole in wells;

gathering systems;

flowlines; and above or below ground horizontal, vertical or any slant positions.

Hydrate formation can be prevented by raising system temperature, by reducing system pressure, or by removing water from the hydrocarbon phase. If those are not under control of an operator, a kinetic inhibitor such as those described herein can be injected to delay the onset of the hydrate formation for a suitable time to avoid the problems associated with their formation.

One example of the field use of kinetic hydrate inhibitors is illustrated in FIG. 1. FIG. 1 illustrates a natural gas production facility in which there is a well 7 with Christmas tree, a downhole safety valve 9, a transport pipeline 8 disposed below the mudline 15, attached to a riser 1, leading to a platform 10 with a dryer 12, a compressor 13, and a separator 14. FIG. 1 illustrates blockages 6 in the tree, manifold and well, as well as a blockage in the flowline 3, and the blockage in the riser 5. The transport pipeline 8 has a portion below the mudline 15 and also a bulge 4 wherein the transport pipeline traverses the sea floor. In field use, kinetic hydrate inhibitor is preferably injected at a suitable point in the natural gas production facility that is upstream of a location where gas hydrate formation is to be expected. As illustrated, hydrates can form in the downhole safety valve, in the tree, the manifold, the well, below the mudline, and in the riser from the sea floor to the platform. Although not illustrated it is also possible to observe gas hydrate formation in an export flowline 2.

EXAMPLES

Example 1

Synthesis of Kinetic Hydrate Inhibitor Polymers

Amino functional polymers suitable as kinetic hydrate inhibitors are synthesized as shown in the following non-limiting examples.

Example 1a

Synthesis of Aspartic Acid/Sorbitol Copolymer

Aspartic acid hydrochloride was made prior to the synthesis of aspartic acid sorbitol copolymer. Aspartic acid (100.0 g, 0.7513 mol) was mixed with hydrochloric acid 36% (76.1 g, 0.7514 mol) and dried at 60° C. for 24 hours. The aspartic acid hydrochloride (52.9 g, 0.312 mol) was added to a 500 ml round bottom flask equipped with a Dean Stark condensation set-up. Sorbitol (57.0 g, 0.313 mol) and a catalyst, p-Toluenesulfonic acid (p-TsOH) (1.1 g, 1 wt %) was added to the aspartic acid hydrochloride and mixed using magnetic stirring. Toluene (100 ml) was added to the mixture. The system was heated in an oil bath. The set temperature in the oil bath was 140° C. The reaction was monitored by the amount of water produced. When theoretical amount of water was reached and no more water would come off, the reaction was stopped. The product was cooled down to ~60° C. and transferred to a suitable container for storage.

Example 1b

Aspartic Acid MEG Polymer

Aspartic acid hydrochloride was made prior to the synthesis of aspartic acid MEG copolymer. Aspartic acid (100.0 g, 0.7513 mol) was mixed with hydrochloric acid 36% (76.1 g, 0.7514 mol) and dried at 60° C. for 24 hours. The aspartic acid hydrochloride (100.0 g, 0.5900 mol) was added to a 500 ml round bottom flask equipped with a Dean Stark condensation set-up. MEG (36.7 g, 0.5913 mol) and a catalyst, p-toluenesulfonic acid (p-TsOH) (1.4 g, 1 wt %) was added to the aspartic acid hydrochloride and mixed using magnetic stirring. Xylene (300 ml) was added to the mixture. The system was heated in an oil bath. The set temperature in the oil bath was 170° C. The reaction was monitored by the amount of water produced. When the theoretical amount of water was reached and no more water came off, the reaction was stopped. The product was cooled down to ~60° C. and transferred to a suitable container for storage.

Example 1c

Aspartic Acid DEG Polymer

Aspartic acid hydrochloride was made prior to the synthesis of aspartic acid DEG copolymer. Aspartic acid (100.0 g, 0.7513 mol) was mixed with hydrochloric acid 36% (76.1 g, 0.7514 mol) and dried at 60° C. for 24 hours. The aspartic acid hydrochloride (50.0 g, 0.2948 mol) was added to a 250 ml round bottom flask equipped with a Dean Stark condensation set-up. DEG (31.3 g, 0.2949 mol) and a catalyst, p-toluenesulfonic acid (p-TsOH) (0.8 g, 1 wt %) was added to the aspartic acid hydrochloride and mixed using magnetic stirring. Xylene (300 ml) was added to the mixture. The system was heated in an oil bath. The set temperature in the oil bath was 170° C. The reaction was monitored by the amount of water produced. When the theoretical amount of water was reached and no more water came off, the reaction was stopped. The product was cooled down to ~60° C. and transferred to a suitable container for storage.

Example 1d

Aspartic Acid TEG Polymer

Aspartic acid (100.0 g, 0.7513 mol) and hydrochloric acid 36% (97.86 g, 0.9662 mol) were added to a 250 ml round bottom flask equipped with a distillation apparatus and mechanical stirring. The aspartic acid and hydrochloric acid were premixed prior to the addition of TEG (146.8 g, 0.9778 mol). The mixture was heated in an oil bath. The set temperature in the oil bath was 160° C. The reaction was monitored by the amount of water produced. When the theoretical amount of water was reached and no more water came off, the reaction was stopped. The product was cooled down to ~60° C. and transferred to a suitable container for storage.

Example 1e

Aspartic Acid PEG 200 Polymer

Aspartic acid hydrochloride was made prior to the synthesis of aspartic acid PEG 200 copolymer. Aspartic acid (100.0 g, 0.7513 mol) was mixed with hydrochloric acid 36% (76.08 g, 0.7514 mol) and dried at 60° C. for 24 hours. The aspartic acid hydrochloride (40.0 g, 0.2358 mol) was added to a 250 ml round bottom flask equipped with a Dean Stark condensation set-up. PEG 200 (47.2 g, 0.2360 mol) and a catalyst, p-toluenesulfonic acid (p-TsOH) (5.4 g, 5.7 wt %) was added to the aspartic acid hydrochloride and mixed using magnetic stirring. Toluene (100 ml) was added to the mixture. The system was heated in an oil bath. The set temperature in the oil bath was 140° C. The reaction was monitored by the amount of water produced. When theoretical amount of water was reached, and no more water would come off, the reaction was stopped. The product was cooled down to ~60° C. and transferred to a suitable container for storage.

Example 1f

Aspartic Acid PEG 400 Polymer

Aspartic acid hydrochloride was made prior to the synthesis of aspartic acid PEG 400 copolymer. Aspartic acid (100.0 g, 0.7513 mol) was mixed with hydrochloric acid 36% (76.08 g, 0.7512 mol) and dried at 60° C. for 24 hours. The aspartic acid hydrochloride (40.0 g, 0.2359 mol) was added to a 250 ml round bottom flask equipped with a Dean Stark condensation set-up. PEG 400 (94.4 g, 0.2360 mol) and a catalyst, p-Toluenesulfonic acid (p-TsOH) (5.4 g, 4.0 wt %) were added to the aspartic acid hydrochloride and mixed using magnetic stirring. Toluene (100 ml) was added to the mixture. The system was heated in an oil bath. The set temperature in the oil bath was 140° C. The reaction was monitored by the amount of water produced. When theoretical amount of water was reached and no more water would come off, the reaction was stopped. The product was cooled down to ~60° C. and transferred to a suitable container for storage.

Example 1g

Synthesis of Aspartic Acid/Propylene Glycol Copolymer

Aspartic acid hydrochloride was made prior to the synthesis of aspartic acid sorbitol copolymer. Aspartic acid (100.0 g, 0.7512 mol) was mixed with hydrochloric acid 36% (76.08 g, 0.7514 mol) and dried at 60° C. for 24 hours. The aspartic acid hydrochloride (50 g, 0.2950? mol) was added to a 500 ml round bottom flask equipped with a Dean Stark condensation set-up. Propylene glycol (22.8 g, 0.3000 mol) and a catalyst, p-toluenesulfonic acid (p-TsOH) (0.7 g, 1 wt %) were added to the aspartic acid hydrochloride and mixed using magnetic stirring. Xylene (300 ml) was added to the mixture. The system was heated in an oil bath. The set temperature in the oil bath was 170° C. The reaction was monitored by the amount of water produced. When theoretical amount of water was reached and no more water would come off, the reaction was stopped. The product was cooled down to ~60° C. and transferred to a suitable container for storage.

Example 2

Measurement of Induction Times of Kinetic Hydrate Inhibitors

Tests are run in triplicate, and induction times are reported individually for each run. The parameter $\Delta T$ is subcooling as described in the specification. The subcooling temperature is a function of the composition of the gas and the experimental pressure. The assumed activity is 100%. The three values for induction time are measured on replicate experiments. To measure the induction time, pressure vs. time curves were followed until a sharp break in pressure was observed. As discussed above, this indicates the onset of take-up of gas by the solution, indicating formation of gas hydrate in the aqueous phase. $T_{setp}$ is the absolute temperature at which the experiment was run. The $T_{setp}$ is chosen to give the indicated subcooling temperature $\Delta T$. The dose is the percentage by weight concentration of the polymer in the test solution. EGMBE is ethylene glycol monobutyl ether. The dosage of EGMBE is the same as of the polymer, unless otherwise indicated. 1.5% AA-MEG in EGMBE (50:50) then means that 1.5% aspartic acid-MEG polymer is mixed with the same amount (based on weight) of EGMBE. In this case 1.5% EGMBE. The designation 50% refers to the ratios (based on weight) between the polymer and EGMBE.

| Example | $\Delta T$ | P (bar) | Inhibitor Concentration (wt % in water) | Polymer | Induction times (h) |
|---|---|---|---|---|---|
| 2b | 4 C. | 14.83 | 1.5 | AA-MEG | 0.5, 0.5, 4.5 |
| 2a | 4 C. | 14.83 | 1.5 | AA-Sorbitol | 7.5, 11 |
| 2g | 4 C. | 14.83 | 1.5 | AA-PG | 5, 5, 0 |
| 2d | 4 C. | 14.8 | 1.5 | AA - MEG in EGMBE (50:50) | 7, 15, 24 |
| 2e | 6 C. | 20 | 3.0 | AA-MEG | 0, 0, 0.5 |
| 2f | 6 C. | 20 | 3.0 | AA-MEG in EGMBE (50:50) | 15, 18, 24 |

Example 3

Kinetic Hydrate Inhibitor with Synergist

Copolymer of aspartic acid and MEG was studied at doses of 0.15 and 0.3 and at subcooling of 4 and 6° with and without EGMBE as synergist. The induction times are given in the table for examples 3a, 3b, and 3c.

| | Inhibitor concentration, Poly Aspartic acid-MEG (wt % in water) | ΔT (C.) | Induction times (h) | |
|---|---|---|---|---|
| | | | Poly Aspartic acid-MEG | Poly Aspartic acid-MEG in EGMBE (50:50) |
| 3a | 1.5 | 4 | 0.5 | 7 |
| | | | 0.5 | 15 |
| | | | 4.5 | 24 |
| 3b | 3.0 | 4 | 21 | — |
| | | | 21 | |
| | | | 3 | |
| 3c | 3.0 | 6 | 0 | 15 |
| | | | 0 | 18 |
| | | | 0.5 | 24 |

The table of example 3 shows the induction times for the Poly Aspartic acid-MEG polymer at concentrations of 1.5% and 3.0%, and at 4 C and 6 C subcooling. The table also includes the improvements in induction times of the polymer when EGMBE is added as synergist. The improvement is significant both at 4 C and 6 C subcooling.

Example 4

Poly Aspartic Acid—Sorbitol Study

Similar to Example 3, Example 4 gives results of a comparison of aspartic acid sorbitol copolymer with aspartic acid MEG copolymer in EGMBE as synergist. Induction times were measured at inhibitor concentrations of 1.5% and 3.0% and at subcooling temperatures of 4° or 6° C.

| | Inhibitor concentration, Poly Aspartic acid-MEG (wt % in water) | ΔT (C.) | Induction times (h) | |
|---|---|---|---|---|
| | | | Poly Aspartic acid-sorbitol | Poly Aspartic acid-Sorbitol in EGMBE (50:50) |
| 4a | 1.5 | 4 | 7.5 | >15 h |
| | | | 11 | >15 h |
| 4b | 1.5 | 6 | 0 | 0.5 |
| | | | 0.5 | 2.5 |
| | | | 2.5 | 11 |
| 4c | 3.0 | 6 | 0 | 7.5 |
| | | | 0 | 12 |
| | | | 4.5 | 15 |

Example 5

Aspartic Acid—TEG

Data were measured on polyaspartic acid/triethyleneglycol polymer (Example 1d). Results of induction time measurements are provided in the Table with and without synergist:

| Inhibitor concentration, Poly Aspartic acid-TEG (wt % in water) | ΔT (C.) | Induction times (h) | |
|---|---|---|---|
| | | Poly Aspartic acid-TEG | Poly Aspartic acid-TEG in EGMBE (50:50) |
| 1.5 | 3.8 | >24 h | 7.5 |
| | | >24 h | 12 |
| | | 15 h | 15 |
| 3.0 | 6 | 3.25 h | >24 h |
| | | 6 h | >24 h |
| | | 21 h | 7.5 h |

What is claimed is:

1. A method for inhibiting gas hydrate formation in an aqueous phase that is in contact with a gaseous or liquid organic phase, the method comprising:
    preparing a composition comprising 10-50% by weight of a kinetic inhibitor, and
    injecting the composition into the aqueous phase to provide the aqueous phase with 0.01-3% by weight of the kinetic inhibitor,
        wherein the kinetic inhibitor is a polyester polymer comprising a polyester backbone chain and a plurality of pendent amino groups that are directly attached to the polyester backbone chain, and
        wherein the polyester polymer is produced by polymerizing a plurality of acid monomers with a plurality of polyols, each of the acid monomers comprising the pendent amino group.

2. The method according to claim 1, wherein the aqueous phase comprises 0.01-2 weight % of the kinetic inhibitor.

3. The method according to claim 1, wherein the inhibitor is made by polymerizing an amino functional diacid, diester, or mixed acid ester with an alkylene or oxyalkylene diol or triol.

4. The method according to claim 1, wherein the inhibitor is made by polymerizing a diacid, diester, or mixed acid ester with an amine functional diol or triol.

5. The method according to claim 1, wherein the acid monomers have the following structure

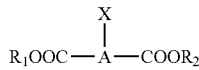

and the polyols have the following structure

wherein X is amino, A is alkylene of 1 to 40 carbon atoms, $R_1$ and $R_2$ are independently —H or alkyl, B is selected from branched or unbranched alkylene and branched or unbranched oxa-substituted alkylene, and n is 2, 3, or 4.

6. The method according to claim 5 wherein A is $C_2$-$C_6$alkylene, B is $C_2$-$C_{12}$ alkylene or polyoxyalkylene, and n is 2 or 3.

7. The method according to claim 5, wherein A is $C_3$ alkylene or $C_4$ alkylene and the polyol component is ethylene glycol, diethylene glycol, or triethylene glycol.

8. The method according to claim 5, wherein the acid monomers are selected from the group consisting of aspartic acid, glutamic acid, protected aspartic acid, and protected glutamic acid.

9. The method according to claim 8, wherein the polyols are selected from the group consisting of ethylene glycol, diethylene glycol, triethylene glycol, and tetraethylene glycol.

10. The method according to claim 1, further comprising providing the aqueous phase with a synergist made of $C_3$ to $C_{10}$ ethers of $C_2$ to $C_4$ glycols.

11. The method according to claim 10, wherein the synergist is $C_3$ to $C_6$ ethers of $C_2$ to $C_3$ glycols.

12. The method according to claim 10, wherein the synergist is selected from the group consisting of 2-butoxyethanol, 2-isopropoxyethanol, 1-propoxy-2-propanol, 2-(2-butoxyethoxy)ethanol, 1-butoxy-2-propanol, and 2-propoxyethanol.

13. The method according to claim 1, wherein a solution of the kinetic inhibitor is greater than 20% biodegradable, exhibits no inherent cloud point behavior upon heating, and gives an induction time greater than 24hours at 6° C. subcooling using synthetic natural gas.

* * * * *